United States Patent
Hu et al.

(10) Patent No.: US 12,086,555 B2
(45) Date of Patent: Sep. 10, 2024

(54) METHOD FOR GENERATING DIALOGUE, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Jianglu Hu, Beijing (CN); Hehan Li, Beijing (CN); Huifeng Sun, Beijing (CN); Shuqi Sun, Beijing (CN); Yue Chang, Beijing (CN); Tingting Li, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 386 days.

(21) Appl. No.: 17/643,053

(22) Filed: Dec. 7, 2021

(65) Prior Publication Data
US 2022/0215180 A1    Jul. 7, 2022

(30) Foreign Application Priority Data

Jan. 4, 2021 (CN) .......................... 202110000726.5

(51) Int. Cl.
*G06F 40/35* (2020.01)
*G06F 16/332* (2019.01)

(52) U.S. Cl.
CPC .......... *G06F 40/35* (2020.01); *G06F 16/3329* (2019.01)

(58) Field of Classification Search
CPC .......... G06F 40/35; G06F 40/00; G06F 40/10; G06F 40/166; G06F 40/20; G06F 40/205;
(Continued)

(56) References Cited

U.S. PATENT DOCUMENTS

| 2015/0235643 A1* | 8/2015 | Kim | ........................ G06F 40/20 |
| | | | 704/275 |
| 2016/0301639 A1* | 10/2016 | Liu | ......................... H04L 51/52 |

(Continued)

FOREIGN PATENT DOCUMENTS

| CN | 3370230 A1 | 9/2018 |
| CN | 109165274 A | 1/2019 |

(Continued)

OTHER PUBLICATIONS

Office Action issued in Chinese Patent Application No. 202110000726. 5, mailed Feb. 19, 2021 (18 pages).

(Continued)

*Primary Examiner* — Qi Han
(74) *Attorney, Agent, or Firm* — Osha Bergman Watanabe & Burton LLP

(57) ABSTRACT

The disclosure provides a method for generating a dialogue. The method includes: obtaining an input sentence; determining a type of a task-based response sentence that is to be generated, by updating a current dialogue state based on the input sentence; generating the task-based response sentence by inputting the input sentence into a task-based dialogue (Continued)

response generator; and determining the task-based response sentence as a target response sentence in response to the type of the task-based response sentence being a designated type.

16 Claims, 6 Drawing Sheets

(58) Field of Classification Search
CPC ........ G06F 40/242; G06F 40/30; G06F 40/40; G06F 40/56
USPC .................................. 704/9, 1, 4, 7, 10, 257
See application file for complete search history.

(56) References Cited

U.S. PATENT DOCUMENTS

| | | | |
|---|---|---|---|
| 2020/0242144 A1 | 7/2020 | Yoshida et al. | |
| 2021/0056521 A1* | 2/2021 | Sharma | G07G 1/01 |
| 2021/0090565 A1* | 3/2021 | Choi | G06F 40/30 |

FOREIGN PATENT DOCUMENTS

| | | |
|---|---|---|
| CN | 110046221 A | 7/2019 |
| CN | 110211573 A | 9/2019 |
| CN | 110750629 A | 2/2020 |
| CN | 111026857 A | 4/2020 |
| CN | 111090728 A | 5/2020 |
| CN | 111104504 A | 5/2020 |
| CN | 111309990 A | 6/2020 |
| CN | 111538823 A | 8/2020 |
| CN | 112131360 A | 12/2020 |
| EP | 3370230 A1 | 9/2018 |
| JP | 2016212541 A | 12/2016 |
| JP | 2020118842 A | 8/2020 |
| WO | 2020202862 A1 | 10/2020 |

OTHER PUBLICATIONS

Office Action issued in Chinese Patent Application No. 202110000726.5, mailed Mar. 16, 2021 (14 pages).
Office Action issued in Chinese Patent Application No. 202110000726.5, mailed Apr. 2, 2021 (13 pages).
First OA for corresponding Chinese Patent Application No. 202110000726.5 and its English translation.
Second OA for corresponding Chinese Patent Application No. 202110000726.5 and its English translation.
Third OA for corresponding Chinese Patent Application No. 202110000726.5 and its English translation.
Extended European Search Report issued in corresponding EP Application No. 21213030.6 dated May 31, 2022 (9 pages).
Sun, Kai et al. "Adding Chit-Chats to Enhance Task-Oriented Dialogues" arXiv.org, Oct. 24, 2020, XP055921660, URL:https://arxiv.org/pdf/2010.12757v1.pdf (12 pages).
Sarikaya, Ruhi "The Technology Behind Personal Digital Assistants: An overview of the system architecture and key components" IEEE Signal Processing Magazine, IEEE, USA, vol. 34, No. 1, Jan. 2017, pp. 67-81, XP011639190 (16 pages).
Jiahuan, Pei et al. "Retrospective and Prospective Mixture-of-Generators for Task-oriented Dialogue Response Generation" arxiv.org, Cornell University Library, 201 Olin Library Cornell University Ithaca, NY 14853, Nov. 19, 2019 XP081603302 (8 pages).
Satoshi, Akasaki et al. "Chat Detection in an Intelligent Assistant : Combining Task-oriented and Non-task-oriented Spoken Dialogue Systems" arxiv.org, Cornell University Library, 201 Olin Library Cornell University Ithaca, NY 14853, May 2, 2017, XP081409194 (12 pages).
Office Action issued for corresonding Japanese patent application 2021-193407, issued Sep. 20, 2022 (10 pages).

* cited by examiner

METHOD FOR GENERATING DIALOGUE, ELECTRONIC DEVICE, AND STORAGE MEDIUM

CROSS-REFERENCE TO RELATED APPLICATION

This application is based upon and claims priority to Chinese Patent Application No. 202110000726.5, filed on Jan. 4, 2021, the content of which is hereby incorporated by reference into this application.

TECHNICAL FIELD

The disclosure relates to the field of computer technologies, specifically to the field of artificial intelligence (AI) technologies such as natural language processing (NLP), speech technologies, knowledge graph (KG), and deep learning (DL), and particularly to a method and an apparatus for generating a dialogue, an electronic device, and a storage medium.

BACKGROUND

Artificial intelligence (AI) has been rapidly developed as the rapid development of computer technologies. Voice assistants, smart speakers, and chat software have also been used more and more widely. Dialogue communication becomes indispensable for voice assistants, smart speakers, chat software, and other fields. It is very important how to generate dialogues quickly and accurately.

SUMMARY

The disclosure provides a method and an apparatus for generating a dialogue, an electronic device, and a storage medium.

According to an aspect, a method for generating a dialogue is provided and includes: obtaining an input sentence; determining a type of a task-based response sentence that is to be generated, by updating a current dialogue state based on the input sentence; generating the task-based response sentence by inputting the input sentence into a task-based dialogue response generator; and determining the task-based response sentence as a target response sentence in response to the type of the task-based response sentence being a designated type.

According to another aspect, an electronic device is provided and includes: at least one processor; and a memory for communicating with the at least one processor; in which, the memory is configured to store instructions executable by the at least one processor, and when the instructions are executed by the at least one processor, the at least one processor performs the method as mentioned above.

According to another aspect, a non-transitory computer-readable storage medium storing computer instructions is provided, in which the computer instructions are configured to cause a computer to perform the method as mentioned above.

It should be understood that the content described in this section is not intended to identify the key or important features of embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the application, in which.

DETAILED DESCRIPTION

Figure 1:
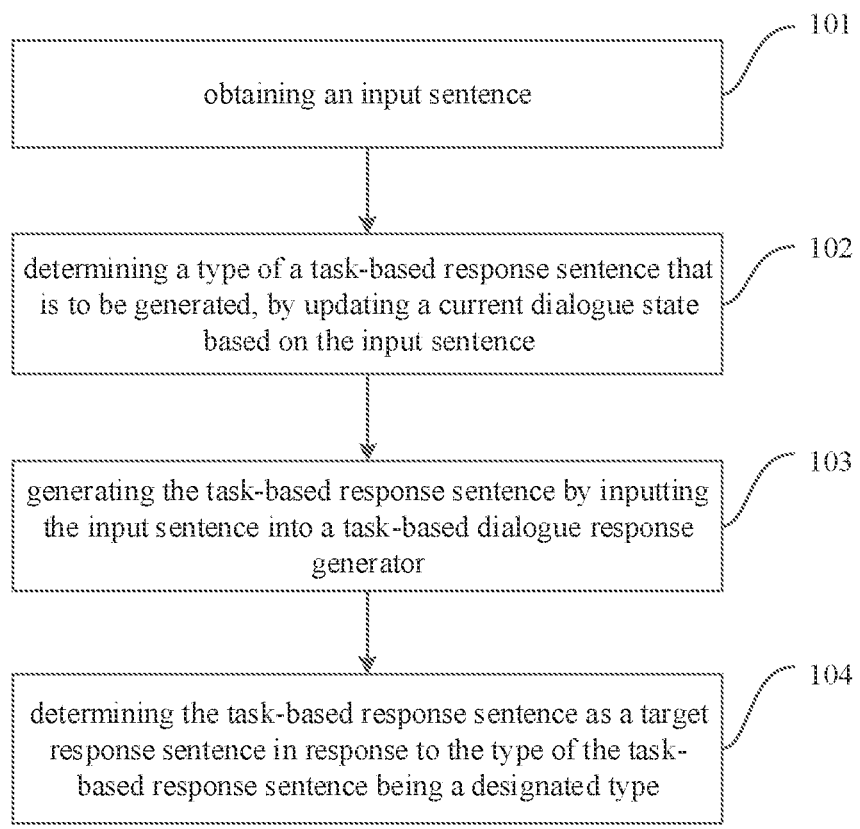
FIG. 1 is a flowchart illustrating a method for generating a dialogue, according to some embodiments of the disclosure.

The following describes some embodiments of the disclosure with reference to the accompanying drawings, which includes various details of embodiments of the disclosure to facilitate understanding and shall be considered merely exemplary. Therefore, those of ordinary skill in the art should recognize that various changes and modifications may be made to embodiments described herein without departing from the scope and spirit of the disclosure. For clarity and conciseness, descriptions of well-known functions and structures are omitted in the following description.

Artificial Intelligence, abbreviated as AI, is a technical science that studies and develops theories, methods, technologies, and application systems for simulating human thinking processes and intelligent behaviors (such as learning, reasoning, thinking, planning) through computers. AI has hardware-level technologies and software-level technologies. AI hardware-level technologies include sensors, dedicated AI chips, cloud computing, distributed storage, big data processing, and the like. AI software-level technologies include computer vision technologies, speech recognition technologies, natural language processing technologies, machine learning, deep learning, big data processing technologies, knowledge graph technologies, and the like.

The natural language processing is to use computers to process, understand, and use human language (such as Chinese, English). It is an interdisciplinary subject of computer science and linguistics, often called as computational linguistics. Because natural language is a fundamental sign that distinguishes humans from other animals, there is no way to talk about human thinking without natural language, so that the natural language processing embodies the highest task and state of AI. That is, when a machine has the ability to process natural language, the machine can be regarded as real intelligence.

The key technologies of speech technologies in the computer field are automatic speech recognition (ASR) and text to speech (TTS). Enabling computers to hear, see, speak, and feel is the future development direction of human-machine interaction. Voice has become the most promising human-machine interaction manner in the future. Voice has more advantages than other interaction manner.

Knowledge graph is essentially a semantic network, which is a graph-based data structure including nodes and edges. In the knowledge graph, each node represents an entity that exists in the real world and each edge is the relationship between the entity and the entity. In layman's terms, the knowledge map is a relational network obtained by connecting all different types of information together. The knowledge graph provides the ability to analyze problems from the perspective of "relationship".

Deep learning refers to a multi-layer artificial neural network and methods of training it. A layer of the neural network may take a large number of matrices as input, take weights through nonlinear activation methods, and generate another data set as output. Through the appropriate number of matrices, multiple layers of organization are linked together to form a neural network "brain" for precise and complex processing, just like people recognizing objects and marking pictures.

The method and the apparatus for generating a dialogue, the electronic device, and the storage medium, provided in some embodiments of the disclosure, are described below with reference to the accompanying drawings.

FIG. 1 is a flowchart illustrating a method for generating a dialogue, according to some embodiments of the disclosure.

The method for generating a dialogue provided in some embodiments of the disclosure may be executed by an apparatus for generating a dialogue provided in some embodiments of the disclosure. The apparatus may be configured in an electronic device. For the convenience of description, the apparatus for generating a dialogue in the following embodiments of the disclosure is simply referred to as "apparatus".

As illustrated in FIG. 1, the method for generating a dialogue includes the following.

101, an input sentence is obtained.

The input sentence may be any sentence, which is not limited by language, length, form, etc. For example, the input sentence may be a Chinese sentence, an English sentence, or an interrogative sentence, a declarative sentence, or a voice sentence, a text sentence. The input sentence is not limited herein.

102, a type of a task-based response sentence that is to be generated, is generated, by updating a current dialogue state based on the input sentence.

There are multiple types for task-based response sentences, such as clarification, satisfaction, and questioning, which are not limited herein.

In some embodiments of the disclosure, in order to improve the accuracy of the determined type of the task-based response sentence that is to be generated, spoken language understanding may be performed on the obtained input sentence firstly, so as to obtain the semantic understanding result of the input sentence, such as intention, word slots included, and other information. Through tracking the dialogue state, the current dialogue state is updated to determine the type of the task-based response sentence that is to be generated.

For example, when the obtained input sentence is "book an air ticket to Shanghai for tomorrow", spoken language understanding is performed on it firstly to obtain the semantic understanding result of the input sentence, in which the intention of the input sentence is to book the air ticket and the destination of the air ticket is Shanghai. Then, through tracking the dialogue state, it may be determined that the current input sentence does not contain information such as the departure, the departure time and there is a lack of word slots. In order to obtain more clear and useful information, the lack of word slots may be clarified, so as to determine the type of the task-based response sentence is the clarification type.

It should be noted that the above are only examples and may not be used as limitations on the input sentence and the type of the task-based response sentence in some embodiments of the disclosure.

103, the task-based response sentence is generated by inputting the input sentence into a task-based dialogue response generator.

The dialogue response generator may analyze the input sentence that is input into the generator to generate the corresponding response sentence.

There are multiple dialog response generators, such as the task-based dialogue response generator and the chat-based dialogue response generator, which is not limited herein.

It is understandable that various types of dialogue response generators may be generated after continuous training based on the corresponding labeled corpus. For example, the task-based dialogue response generator may be trained and generated based on labeled input sentences and corresponding task-based response sentences and the chat-based dialogue response generator may be trained and generated based on labeled input sentences and corresponding chat-based response sentences, which is not limited herein.

For example, when the input sentence is "what time is it?", the input sentence is input into the task-based dialogue response generator, the task-based response sentence "it is seven ten in the morning" may be obtained.

Or, when the input sentence is "weather query", the input sentence is input into the task-based dialogue response generator, the task-based response sentence "today's temperature: 3-10 degrees Celsius" may be obtained.

It should be noted that the above are only examples and may not be used as limitations on the task-based response sentence in some embodiments of the disclosure.

104, the task-based response sentence is determined as a target response sentence in response to the type of the task-based response sentence being a designated type.

The target response sentence is a sentence that the apparatus finally determines to output and responds to the input sentence.

There are multiple types for task-based response sentences, such as clarification, satisfaction, and questioning, which are not limited herein.

Generally, the clarification-type sentence may include any kind of clarification of a certain fact, such as the clarification of the lack of word slot, the clarification of the positive or negative attitude, and the clarification of multiple results, which is not limited herein. The satisfaction-type sentence may indicate that the dialogue task has been achieved, the purpose has been achieved, or the problem has been solved. That is, no matter whether the task-based response sentence is the clarification type or the satisfaction type, it may indicate that the task-based dialogue is currently in a normal dialogue flow. The response sentence is a clear answer to the current dialogue task, so that the apparatus may use the task-based response sentence as the target response sentence. That is, the designated type in some embodiments of the disclosure is the clarification type or the satisfaction type.

For example, when the input sentence is "weather query", after the input sentence is input into the task-based dialogue response generator, the generated task-based response sentence may be "what day's weather do you want to check?", the type of the response sentence is the clarification type that belongs to the designated type, and the apparatus may determine the response sentence "what day's weather do you want to check?" as the target response sentence.

Or, when the input sentence is "I want to have a drink", after the input sentence is input into the task-based dialogue response generator, the generated task-based response sentence is "Do you want juice, coffee, or milk tea", the type of the response sentence is the clarification type that belongs to the designated type, and the apparatus may determine the response sentence "Do you want juice, coffee, or milk tea" as the target response sentence.

Or, when the input sentence is "weather query", after the input sentence is input into the task-based dialogue response generator, the generated task-based response sentence may be "Today's weather is sunny", the type of the response sentence is the satisfaction type that belongs to the designated type, and the apparatus may determine the response sentence "Today's weather is sunny" as the target response sentence.

It should be noted that the above are only examples and may not be used as limitations on the target response sentence in some embodiments of the disclosure.

In some embodiments of the disclosure, the input sentence is obtained; the current dialogue state is updated based on the input sentence to determine the type of the task-based response sentence that is to be generated; the task-based response sentence is generated by inputting the input sentence into the task-based dialogue response generator; and the task-based response sentence is determined as the target response sentence in response to the type of the task-based response sentence being the designated type. Therefore, when generating the dialogue, the task-based response sentence with the designated type is returned as the target response sentence, so as to return the task-based response sentence as much as possible under the condition of ensuring the smooth progress of dialogues, improving the performance of the dialogue system and provide a user a better and faster dialogue experience.

In the above embodiments, by inputting the input sentence into the task-based dialogue response generator, the corresponding task-based response sentence may be obtained. When the task-based response sentence is the designated-type sentence, the task-based response sentence may be determined as the target response sentence corresponding to the input sentence. When the input sentences are different, the types of the task-based response sentences obtained by inputting them input into the task-based dialogue response generator may be the same or different, so there may be the sentences with the designated type or the sentences without the designated type. Further, in order to make the determined target response sentence more accurate and reasonable, the following describes the situation in which the obtained task-based response sentence is a non-designated-type sentence in conjunction with FIG. 2.

Figure 2:
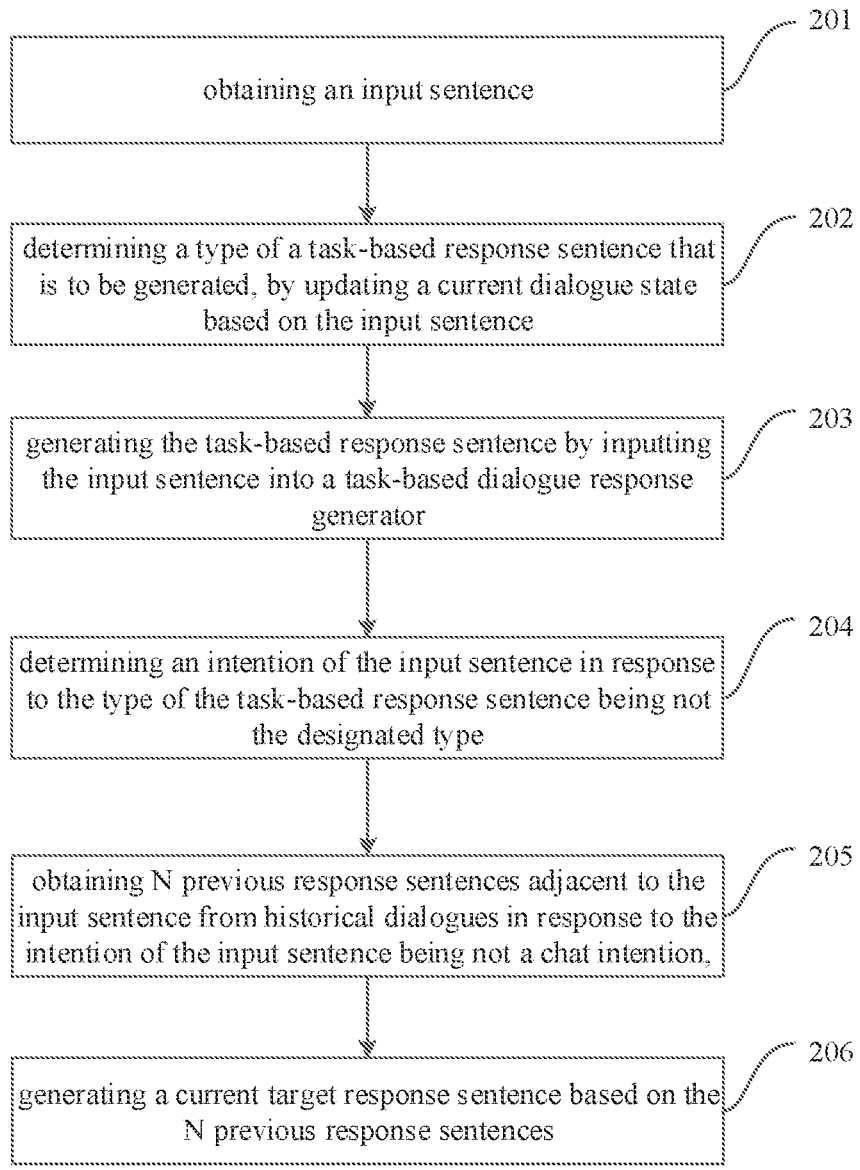
FIG. 2 is a flowchart illustrating a method for generating a dialogue, according to some embodiments of the disclosure.

FIG. 2 is a flowchart illustrating a method for generating a dialogue, according to some embodiments of the disclosure.

201, an input sentence is obtained.

202, a type of a task-based response sentence that is to be generated, is generated, by updating a current dialogue state based on the input sentence.

203, the task-based response sentence is generated by inputting the input sentence into a task-based dialogue response generator.

204, an intention of the input sentence is determined in response to the type of the task-based response sentence being not the designated type.

The designated type in some embodiments of the disclosure is the clarification type or the satisfaction type. Correspondingly, the non-designated type is any other type that does not belong to the clarification type or the satisfaction type, such as a questioning type, that is, the task-based response sentence may not indicate that the dialogue task has been achieved, the purpose has been achieved, or the problem has been solved. Some embodiments of the disclosure do not limit the non-designated types of sentences.

It is understandable that the corresponding task-based response sentence may be generated by inputting the obtained input sentence into the task-based dialogue response generator. If the type of the task-based response sentence is not the designated type, it indicates that the response sentence is not the clear answer given for the current dialogue task, which may not achieve the dialogue purpose contained in the current input sentence. In order to make the generated response sentence more accurate and reasonable and to achieve the user's purpose as soon as possible, an intention of the input sentence may be further determined and then the corresponding operation may be performed.

205, N previous response sentences adjacent to the input sentence are obtained from historical dialogues in response to the intention of the input sentence being not a chat intention, where N is a positive integer.

The intention of the input sentence may be multiple, such as chat intention, demand intention, task intention, which is not limited herein.

In some embodiments of the disclosure, when the intention of the input sentence is not the chat intention, in order to give a better answer to the intention as much as possible, the apparatus may obtain the adjacent response sentences from the previous historical dialogues.

206, a current target response sentence is generated based on the N previous response sentences.

In actual use, the target response sentence may be generated in different ways based on different values of N.

Generally, in the dialogue process, there is a certain continuity and correlation among various input sentences. In some embodiments of the disclosure, when the task-based response sentence generated based on the current input sentence is the non-designated-type sentence, by considering the correlation among various input sentences, the current target response sentence may be determined based on the response sentence corresponding to the previous input sentence, which not only ensures the smooth progress of the current dialogue, but also ensures that the returned response sentence is not abrupt, making the user have a better experience sense.

For example, in the case where the intention of the input sentence is not the chat intention, when N is equal to 1, the target response sentence may be determined based on the previous response sentence adjacent to the input sentence in the dialogue history.

In detail, when the previous response sentence adjacent to the input sentence in the obtained dialogue history is of the clarification type, it indicates that the response sentence is a sentence for the purpose of achieving the user's dialogue task and based on the user's needs, so it may be used as the current target response sentence.

For example, if the current input sentence is "I want to navigate", it may be input into the task-based dialogue response generator. If the generated task-based dialogue response sentence is a non-designated-type sentence, it indicates that the response sentence does not affect the current user's dialogue task. At this point, in order to make a more accurate response to the dialogue task, the intention of the input sentence may be further determined. The input sentence "I want to navigate" is a non-chat-intention sentence, so the previous response sentence adjacent to the current input sentence in the dialogue history may be selected. If the input sentence in the previous round of dialogue in the dialogue history is "check the weather in Beijing" and the corresponding response sentence is "what day's weather to check?", this response sentence is the clarification task-based response sentence, which has already been made to the dialogue task. At this point, in order to give the user a more accurate answer to the current dialogue task, the previous round of clarification task-based response sentence "what day's weather to check?" may be selected to be repeated, so as to guide the user to say the current intention again to continue to achieve task.

Or, when the previous response sentence adjacent to the input sentence in the dialogue history is the non-clarification task-based response sentence, it indicates that the response sentence is not in the process for the purpose of task achievement. At this time, in order to reach the user as much as possible, for the dialogue task, a designated response sentence may be selected, such as the backstop response sentence as the current target response sentence.

For example, if the current input sentence is "I want to navigate", it is a non-chat-intention sentence. The previous response sentence adjacent to the current input sentence in the dialogue history may be selected. If the input sentence in the previous round of dialogue is "check the weather in Beijing" and the corresponding response sentence is "I don't understand what you mean", the response sentence is not the clarification task-based response sentence, indicating that the response sentence is not helpful to achieve the user dialogue task. At this point, in order to continue to achieve the current dialogue task, the backstop response sentence may be selected as the current target response sentence, such as the sentence "I don't know how to reply to you" may be used as the current target response sentence.

It should be noted that the above are only examples and may not be used as limitations for determining the target response sentence in some embodiments of the disclosure.

Or, when N is greater than 1, because the input sentence is not intended for chat, it indicates that the current user's input sentence needs to achieve a certain task. At this time, it is necessary to respond to the dialogue task contained in the input sentence. In order to ensure that the task dialogue can continue, a clarification task-based response sentence in the historical dialogues may be used to generate the target response sentence.

In some embodiments of the disclosure, when the current target response sentence is determined based on the clarification task-based response sentence in the N previous response sentences, there may be multiple determination manners, such as determination based on semantic similarity and determination based on time interval.

For example, the target response sentence may be determined based on the semantic similarity. A clarification task-based response sentence having a greatest semantic similarity with the input sentence is determined from the N previous response sentences as the current target response sentence.

For example, if the input sentence is "Today's weather is really good" and when N is 3, 3 previous response sentences obtained may be "What do you want to query?", "Do you want to query weather or time?", "Query which day's weather". These three response sentences are all clarification task-based sentences. The semantic similarity between each of these three response sentences and the input sentence is calculated to obtain that the semantic similarity between "Query which day's weather" and the input sentence is the greatest, so that "Query which day's weather" may be used as the current target response sentence.

It should be noted that the above are only examples and may not be used as limitations for determining the target response sentence in some embodiments of the disclosure.

Or, the target response sentence may be determined based on the time interval. A clarification task-based response sentence having a shortest time interval with the input sentence is determined from the N previous response sentences as the current target response sentence.

For example, when N is 3 and the input sentence is "What is suitable for such good weather?", in chronological order, the previous three response sentences are "Do you want to check weather or check time", "Query which day's weather", "The weather is really good", in which, "The weather is really good" is the clarification task-type response sentence with the shortest time interval with the input sentence and "The weather is really good" is used as the current target response sentence.

It should be noted that the above are only examples and may not be used as limitations for determining the target response sentence in some embodiments of the disclosure.

In some embodiments of the disclosure, the current dialogue state is first tracked based on the obtained input sentence to determine the type of the task-based response sentence that is to be generated. The input sentence is input to the task-based dialogue response generator to generate the task-based response sentence. When the type of the task-based response sentence is the non-designated type, the intention of the input sentence may be further determined. In the case where the intention of the input sentence is not the chat intention, the N previous response sentences adjacent to the input sentence in the historical dialogues are obtained and the corresponding manner is selected based on the N previous response sentences to generate the current target response sentence. Thus, when the task-based response sentence generated by the task-based dialogue response generator is of the non-designated type and the input sentence is not intended to be the chat, the current target response sentence is determined based on the previous one or more response sentences adjacent to the input sentence in the historical dialogues, so as to not only ensure that the dialogue continues for the purpose of task achievement as much as possible and the task satisfaction rate may be improved, but also make the returned response sentence not abrupt, enabling the user to obtain a good dialogue experience.

In the above embodiments, when the task-based response sentence with the non-designated type is obtained, the intention of the input sentence is further determined. For the input sentence that is not the chat intention, the corresponding target response sentence may be generated based on the response sentence adjacent to the input sentence in the dialogue history. It is understandable that, in actual use, the input sentence may also be a sentence intended for chat. At this time, in order to make the dialogue more coherent and avoid continuous meaningless dialogue, the current dialogue may be further determined to determine the corresponding target response sentence. The case where the input sentence is the chat intention will be described in detail below with reference to FIG. 3.

Figure 3:
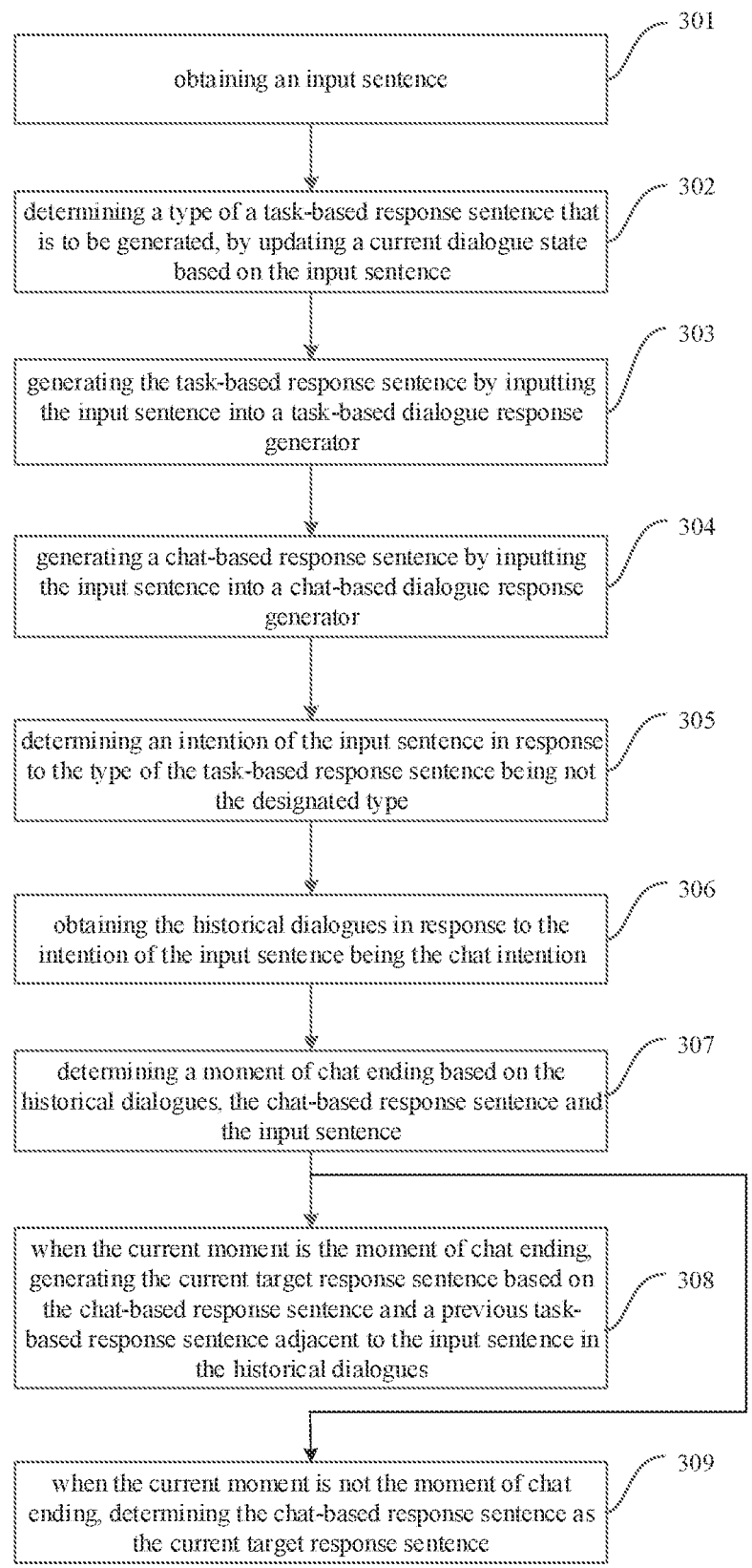
FIG. 3 is a flowchart illustrating a method for generating a dialogue, according to some embodiments of the disclosure.

FIG. 3 is a flowchart illustrating a method for generating a dialogue, according to some embodiments of the disclosure.

301, an input sentence is obtained. 302, a type of a task-based response sentence that is to be generated, is generated, by updating a current dialogue state based on the input sentence.

303, the task-based response sentence is generated by inputting the input sentence into a task-based dialogue response generator.

304, a chat-based response sentence is generated by inputting the input sentence into a chat-based dialogue response generator.

It should be noted that when 303 and 304 are used, there is no particular order and here is only one of the implementation manners, which may not be used as limitations to the disclosure.

305, an intention of the input sentence is determined in response to the type of the task-based response sentence being not the designated type.

306, the historical dialogues are obtained in response to the intention of the input sentence being the chat intention.

In some embodiments of the disclosure, the historical dialogues may be the previous round of dialogue sentences, closest to the current dialogue, or the previous rounds of dialogue sentences, closest to the current dialogue, or the previous task-based response sentence closest to the current dialogue, which is not limited herein.

It should be noted that if the user wants to continue the chat after the user enters the input sentence of the chat intention, in order to satisfy the user's needs, the chat-based response sentence may be used as the current target response sentence to continue the dialogue with the user.

307, a moment of chat ending is determined based on the historical dialogues, the chat-based response sentence and the input sentence.

In actual use, it may be determined whether an associated task of the historical dialogues has been completed based on a type of a response sentence in the historical dialogues.

For example, if the type of the response sentence in the historical dialogues is the clarification type, it indicates that the associated task of the historical dialogues may not have been completed. For example, the historical input sentence is "Query the weather", the historical response sentence is "Where is the weather to query?", and this historical response sentence is a clarification-type sentence, so that the apparatus does not perform the weather query and the associated task of the historical dialogues is not completed.

Or, if the type of the response sentence in the historical dialogues is the satisfaction type, it indicates that the associated task of the historical dialogues may have been completed. For example, the historical input sentence is "Query the weather", the historical response sentence is "weather is fine today with breeze", and this historical response sentence is a satisfaction-type sentence, so that the apparatus responds to the user for weather conditions, satisfies the user's "weather query" needs, and the associated task of the historical dialogues has been completed.

It should be noted that the above are only examples and may not be used as limitations on the types of response sentences in the historical dialogues and the determination of whether the associated task of the historical dialogues has been completed in some embodiments of the disclosure.

After that, when the associated task of the historical dialogues is not completed, a relevance between the chat-based response sentence, the input sentence and the associated task is determined.

For example, the input sentence in the historical dialogues is "Check the weather in Beijing" and the corresponding response sentence is "Which day's weather to check?", so that the user has not got the specific information about the weather in Beijing and the associated task of the historical dialogues has not been completed yet. The input sentence in the current dialogue is "Do you want to go out to play today" and the correspondingly generated chat-based response sentence may be "If the weather is good, you can go out to play", so as to determine the relevance between the chat-based response sentence, the input sentence and the associated task.

It should be noted that the above are only examples and may not be used as limitations on the input sentence and the corresponding response sentence of the historical dialogues, and the determination of the relevance between the chat-based response sentence, the input sentence and the associated task in some embodiments of the disclosure.

Further, it is determined that a current moment is the moment of chat ending in response to the relevance being greater than a threshold.

The threshold may be a preset value, which may be specifically preset according to specific conditions and is not limited herein.

For example, the threshold is 0.7, the relevance is 0.95, and the relevance is greater than the threshold, indicating that the current input sentence and the chat-based response sentence are closely related to the associated task of the historical dialogues. At this time, it is not abrupt to end the chat and it may continue to complete the associated task of the historical dialogues, which may not only satisfy user requirements, but also bring a good sense of use to the user.

It should be noted that the above are only examples and may not be used as limitations on the relevance, the threshold, and the timing for determining the current moment to end the chat in some embodiments of the disclosure.

Or, when the relevance is less than or equal to the threshold, it is determined that the current moment is not the moment of chat ending.

For example, the threshold is 0.6, the relevance is 0.1, and the relevance is much smaller than the threshold, indicating that the current input sentence and the chat-based response sentence have low relevance to the associated task of the historical dialogues. At this time, if it directly ends the chat, it will make the dialogue appear blunt and abrupt and it is inconsistent with the user's response, which may give the user a less satisfactory dialogue experience.

It should be noted that the above are only examples and may not be used as limitations on the relevance, the threshold, and the timing for determining the current moment to end the chat in some embodiments of the disclosure.

In addition, when the associated task of the historical dialogues has been completed, it is determined that the current moment is not the moment of chat ending.

When the associated task of the historical dialogues has been completed, it indicates that the user's main problem has been solved. It may be determined that the current moment is not the moment of chat ending. At this time, the current chat may be continued or the backstop mode can be selected, which is not limited herein.

308, when the current moment is the moment of chat ending, the current target response sentence is generated based on the chat-based response sentence and a previous task-based response sentence adjacent to the input sentence in the historical dialogues.

If the current dialogue task has not been completed, it indicates that chat should be avoided as much as possible at the current moment, that is, it is necessary to end the chat and continue to return to the task-based dialogue. In order to achieve the dialogue task, the chat-based response and the last round of response of the most recent previous task-based dialogue of the current dialogue in the historical dialogues may be used as the target response sentence, so that it will not cause loss of information but also generate a more coherent dialogue. At the same time, may can also focus on the dialogue task to satisfy user needs.

For example, when the previous round of input sentence is "Check weather in Beijing" and the corresponding response sentence is "Which day's weather to check?", if the input sentence at the current moment is a sentence of "Chatting with me for a moment", it may be judged that the dialogue task has not been completed yet based on the previous task-based response sentence "Which day's weather to check?". At this time, the chat may be ended to continue the dialogue task. In order to guide the user to continue to achieve the dialogue task, at this time, the target response sentence may be generated based on the chat-based response sentence and the previous round of response sentence, such as "Let's chat and did you ask which day's weather you want to check?".

It should be noted that the above are only examples and may not be used as limitations on the generation of target response sentences in some embodiments of the disclosure.

309, when the current moment is not the moment of chat ending, the chat-based response sentence is determined as the current target response sentence.

It is determined that the current moment is not suitable for ending the chat based on the historical dialogues, the chat-based response sentence and the input sentence, the chat should be continued with the user. At this time, the chat-based response sentence may be used as the current target response sentence.

For example, the current input sentence is "Let's go out and play together", which is a sentence with the chat intention. The input sentence in the previous round of dialogue is "Check today's weather in Beijing" and the corresponding response sentence is "Today is sunny and breezy in Beijing". It may be judged that the task of this round of dialogue has been achieved and the user's needs have been met based on the corresponding response sentence. Then it may be judged that the user may be in a state where he/she wants to chat based on the user's current input sentence and it may continue the chat with the user, so that the user may get a good dialogue experience. Therefore, the chat-based response sentence may be used as the current target response sentence.

It should be noted that the above are only examples and may not be used as limitations on the generation of target response sentences in some embodiments of the disclosure.

In some embodiments of the disclosure, the input sentence is first obtained. The current dialogue state is updated based on the input sentence to determine the type of the task-based response sentence that is to be generated. The obtained input sentence is input into the task-based dialogue response generator and the chat-based dialogue response generator to generate the corresponding task-based response sentence and chat-based response sentence. When the task-based response sentence is the non-designated-type sentence and the input sentence is the chat intention, it combines the historical dialogues and the chat-based response sentence to judge whether the chat can be ended and determine the target response sentence based on whether the chat needs to be ended. Therefore, when the input sentence is obtained, the target response sentence to be returned is determined based on the type of the task-based response sentence, the intention of the input sentence, and the timing of ending the chat, so as to ensure that the dialogue may achieve the user' task. It may also make the dialogue smooth and coherent, giving the user a better dialogue experience.

Figure 4:
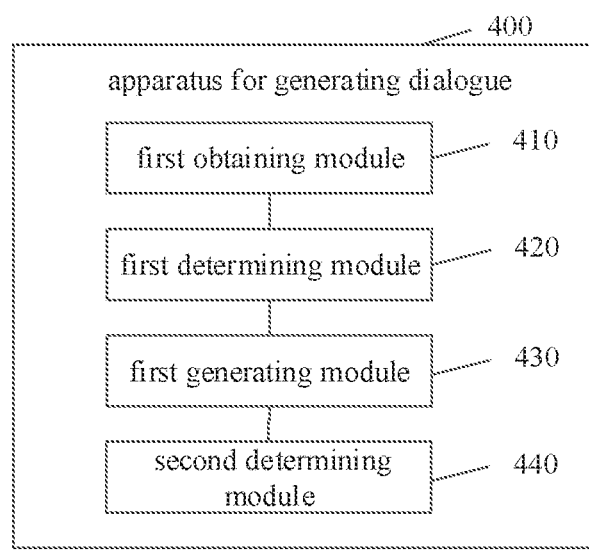
FIG. 4 is a block diagram illustrating an apparatus for generating a dialogue, according to some embodiments of the disclosure.

In order to implement the above-mentioned embodiments, some embodiments of the disclosure also propose an apparatus for generating a dialogue. FIG. 4 is a block diagram illustrating an apparatus for generating a dialogue, according to some embodiments of the disclosure.

As illustrated in FIG. 4, the apparatus 400 includes a first obtaining module 410, a first determining module 420, a first generating module 430, and a second determining module 440.

The first obtaining module 410 is configured to obtain an input sentence.

The first determining module 420 is configured to determine a type of a task-based response sentence that is to be generated, by updating a current dialogue state based on the input sentence.

The first generating module 430 is configured to generate the task-based response sentence by inputting the input sentence into a task-based dialogue response generator.

The second determining module 440 is configured to determine the task-based response sentence as a target response sentence in response to the type of the task-based response sentence being a designated type.

It should be noted that the functions and specific implementation principles of the foregoing modules in some embodiments of the disclosure may refer to the foregoing method embodiments and details are not described herein again.

With the apparatus for generating a dialogue, provided in some embodiments of the disclosure, the input sentence is obtained; the current dialogue state is updated based on the input sentence to determine the type of the task-based response sentence that is to be generated; the task-based response sentence is generated by inputting the input sentence into the task-based dialogue response generator; and the task-based response sentence is determined as the target response sentence in response to the type of the task-based response sentence being the designated type. Therefore, when generating the dialogue, the task-based response sentence with the designated type is returned as the target response sentence, so as to return the task-based response sentence as much as possible under the condition of ensuring the smooth progress of dialogues, improving the performance of the dialogue system and provide a user a better and faster dialogue experience.

Figure 5:
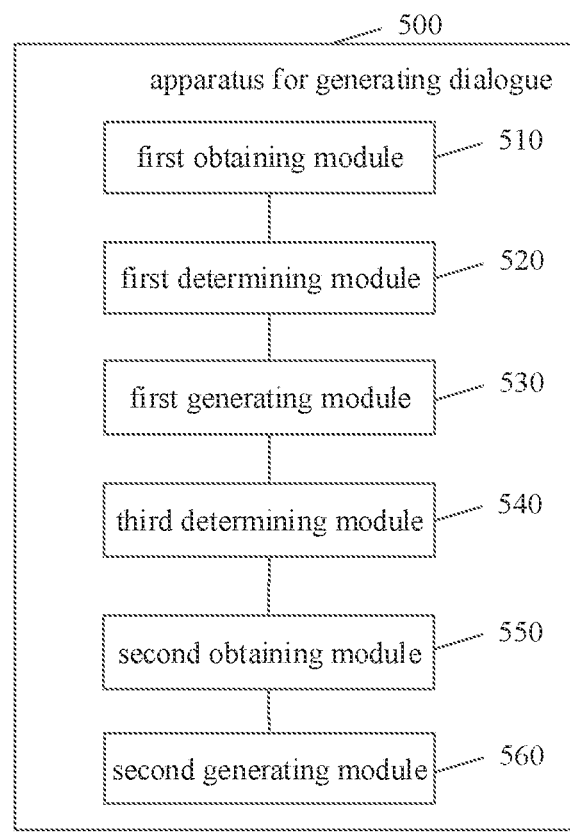
FIG. 5 is a block diagram illustrating an apparatus for generating a dialogue, according to some embodiments of the disclosure.

FIG. 5 is a block diagram illustrating an apparatus for generating a dialogue, according to some embodiments of the disclosure.

As illustrated in FIG. 5, the apparatus 500 includes a first obtaining module 510, a first determining module 520, a first generating module 530, a third determining module 540, a second obtaining module 550, and a second generating module 560.

The first obtaining module 510 is configured to obtain an input sentence.

It may be understood that the first obtaining module 510 in the embodiments may have the same function and structure as the first obtaining module 410 in the foregoing embodiments.

The first determining module 520 is configured to determine a type of a task-based response sentence that is to be generated, by updating a current dialogue state based on the input sentence.

It may be understood that the first determining module 520 in the embodiments may have the same function and structure as the first determining module 420 in the foregoing embodiments.

The first generating module 530 is configured to generate the task-based response sentence by inputting the input sentence into a task-based dialogue response generator.

It may be understood that the first generating module 530 in the embodiments may have the same function and structure as the first generating module 430 in the foregoing embodiments.

The third determining module 540 is configured to determine an intention of the input sentence in response to the type of the task-based response sentence being not the designated type.

The second obtaining module 550 is configured to obtain N previous response sentences adjacent to the input sentence from historical dialogues in response to the intention of the input sentence being not a chat intention, where N is a positive integer.

The second generating module 560 is configured to generate a current target response sentence based on the N previous response sentences.

In a possible implementation manner, the second generating module 560 may be specifically configured to determine a previous response sentence as the current target response sentence in response to the previous response sentence being a clarification task-based sentence; or determine a designated response sentence as the current target response sentence in response to a previous response sentence being not a clarification task-based sentence.

In another possible implementation manner, the second generating module 560 may be specifically configured to determine, from the N previous response sentences, a clarification task-based response sentence having a greatest semantic similarity with the input sentence, as the current target response sentence; or determine, from the N previous response sentences, a clarification task-based response sentence having a shortest time interval with the input sentence, as the current target response sentence.

It should be noted that the functions and specific implementation principles of the foregoing modules in some embodiments of the disclosure may refer to the foregoing method embodiments and details are not described herein again.

With the apparatus for generating a dialogue, provided in some embodiments of the disclosure, the current dialogue state is first tracked based on the obtained input sentence to determine the type of the task-based response sentence that is to be generated. The input sentence is input to the task-based dialogue response generator to generate the task-based response sentence. When the type of the task-based response sentence is the non-designated type, the intention of the input sentence may be further determined. In the case where the intention of the input sentence is not the chat intention, the N previous response sentences adjacent to the input sentence in the historical dialogues are obtained and the corresponding manner is selected based on the N previous response sentences to generate the current target response sentence. Thus, when the task-based response sentence generated by the task-based dialogue response generator is of the non-designated type and the input sentence is not intended to be the chat, the current target response sentence is determined based on the previous one or more response sentences adjacent to the input sentence in the historical dialogues, so as to not only ensure that the dialogue continues for the purpose of task achievement as much as possible and the task satisfaction rate may be improved, but also make the returned response sentence not abrupt, enabling the user to obtain a good dialogue experience.

Figure 6:
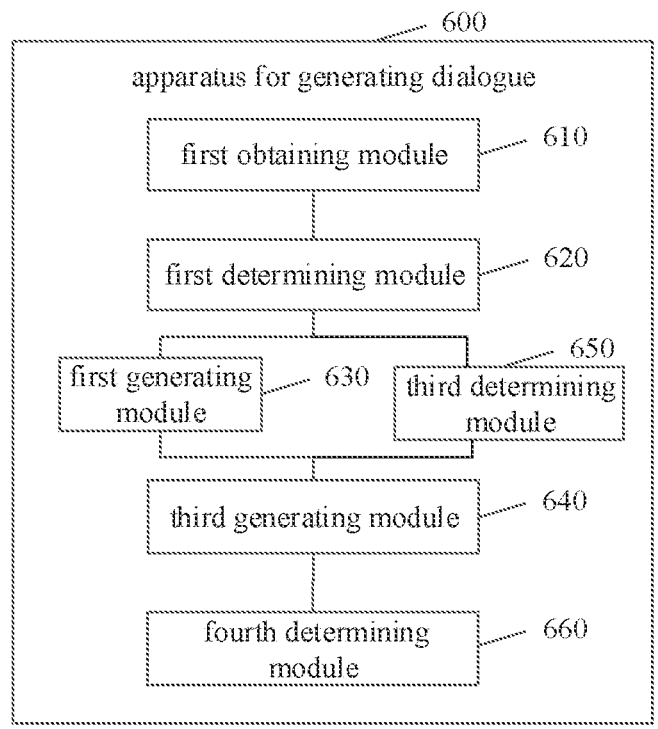
FIG. 6 is a block diagram illustrating an apparatus for generating a dialogue, according to some embodiments of the disclosure.

FIG. 6 is a block diagram illustrating an apparatus for generating a dialogue, according to some embodiments of the disclosure.

As illustrated in FIG. 6, the apparatus 600 includes a first obtaining module 610, a first determining module 620, a first generating module 630, a third determining module 640, a third generating module 650, and a fourth determining module 660.

The first obtaining module 610 is configured to obtain an input sentence.

It may be understood that the first obtaining module 610 in the embodiments may have the same function and structure as any first obtaining module in the foregoing embodiments.

The first determining module 620 is configured to determine a type of a task-based response sentence that is to be generated, by updating a current dialogue state based on the input sentence.

It may be understood that the first determining module 620 in the embodiments may have the same function and structure as any first determining module in the foregoing embodiments.

The first generating module 630 is configured to generate the task-based response sentence by inputting the input sentence into a task-based dialogue response generator.

It may be understood that the first generating module 630 in the embodiments may have the same function and structure as any first generating module in the foregoing embodiments.

The third determining module 640 is configured to determine an intention of the input sentence in response to the type of the task-based response sentence being not the designated type.

It may be understood that the third determining module 640 in the embodiments may have the same function and structure as the third determining module 540 in the foregoing embodiments.

The third generating module 650 is configured to generate a chat-based response sentence by inputting the input sentence into a chat-based dialogue response generator.

The fourth determining module 660 is configured to determine the chat-based response sentence as the current target response sentence in response to the intention of the input sentence being the chat intention.

In a possible implementation manner, the apparatus further includes: a fourth generating module, configured to generate a chat-based response sentence by inputting the input sentence into a chat-based dialogue response generator; a third obtaining module, configured to obtain the historical dialogues in response to the intention of the input sentence being the chat intention; a fifth determining module, configured to determine a moment of chat ending based on the historical dialogues, the chat-based response sentence and the input sentence.

In a possible implementation manner, the fifth determining module is configured to: determine whether an associated task of the historical dialogues has been completed based on a type of a response sentence in the historical dialogues; determine a relevance between the chat-based response sentence, the input sentence and the associated task in response to the associated task of the historical dialogues is not completed; and determine that a current moment is the moment of chat ending in response to the relevance being greater than a threshold.

In a possible implementation manner, the fifth determining module is configured to: determine that the current moment is not the moment of chat ending in response to that the associated task of the historical dialogues has been completed.

In a possible implementation manner, the fifth determining module is configured to: determine that the current moment is not the moment of chat ending in response to that the relevance being less than or equal to the threshold.

In a possible implementation manner, the fourth generating module is configured to, when a current moment is the moment of chat ending, generate the current target response sentence based on the chat-based response sentence and a previous task-based response sentence adjacent to the input sentence in the historical dialogues.

In a possible implementation manner, the second determining module is configured to: when the current moment is not the moment of chat ending, determine the chat-based response sentence as the current target response sentence.

It should be noted that the functions and specific implementation principles of the foregoing modules in some embodiments of the disclosure may refer to the foregoing method embodiments and details are not described herein again.

With the apparatus for generating a dialogue, provided in some embodiments of the disclosure, the input sentence is first obtained. The current dialogue state is updated based on the input sentence to determine the type of the task-based response sentence that is to be generated. The obtained input sentence is input into the task-based dialogue response generator and the chat-based dialogue response generator to generate the corresponding task-based response sentence and chat-based response sentence. When the task-based response sentence is the non-designated-type sentence and the input sentence is the chat intention, it combines the historical dialogues and the chat-based response sentence to judge whether the chat can be ended and determine the target response sentence based on whether the chat needs to be ended. Therefore, when the input sentence is obtained, the target response sentence to be returned is determined based on the type of the task-based response sentence, the intention of the input sentence, and the timing of ending the chat, so as to ensure that the dialogue may achieve the user' task. It may also make the dialogue smooth and coherent, giving the user a better dialogue experience.

According to some embodiments of the disclosure, the disclosure also provides an electronic device and a readable storage medium.

Figure 7:
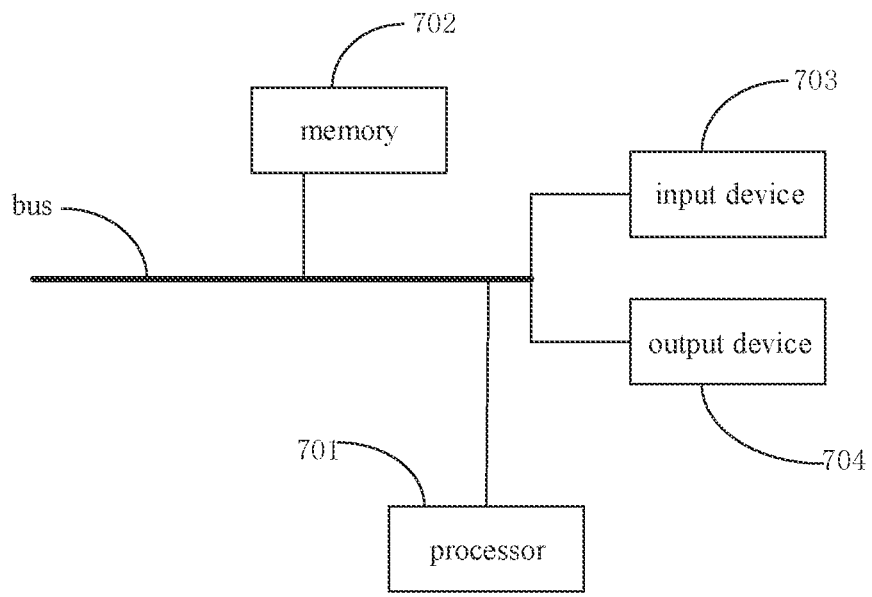
FIG. 7 is a block diagram illustrating an electronic device for implementing a method for generating a dialogue, according to some embodiments of the disclosure.

As illustrated in FIG. 7, it is a block diagram of an electronic device for implementing a method for generating a dialogue, according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules corresponding to the method in the embodiment of the disclosure (for example, a first obtaining module 410, a first determining module 420, a first generating module 430, and a second determining module 440 in FIG. 4). The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet, and block chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system to solve management difficulty and weak business scalability defects of traditional physical hosts and Virtual Private Server (VPS) services. The server may also be a distributed system server, or a server combined with block chain.

With the solution in the embodiments of the disclosure, the input sentence is obtained; the current dialogue state is updated based on the input sentence to determine the type of the task-based response sentence that is to be generated; the task-based response sentence is generated by inputting the input sentence into the task-based dialogue response generator; and the task-based response sentence is determined as the target response sentence in response to the type of the task-based response sentence being the designated type. Therefore, when generating the dialogue, the task-based response sentence with the designated type is returned as the target response sentence, so as to return the task-based response sentence as much as possible under the condition of ensuring the smooth progress of dialogues, improving the performance of the dialogue system and provide a user a better and faster dialogue experience.

The disclosure also provides a computer program product including a computer program is provided, in which, when the computer program is executed by a processor, the method another is performed.

When the computer program is executed by a processor, the following beneficial effects may be provided.

The input sentence is obtained; the current dialogue state is updated based on the input sentence to determine the type of the task-based response sentence that is to be generated; the task-based response sentence is generated by inputting the input sentence into the task-based dialogue response generator; and the task-based response sentence is determined as the target response sentence in response to the type of the task-based response sentence being the designated type. Therefore, when generating the dialogue, the task-based response sentence with the designated type is returned as the target response sentence, so as to return the task-based response sentence as much as possible under the condition of ensuring the smooth progress of dialogues, improving the performance of the dialogue system and provide a user a better and faster dialogue experience.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors.

Any modification, equivalent replacement and improvement made within the spirit and principle of this application shall be included in the protection scope of this application.

The invention claimed is:

1. A method for generating a dialogue, comprising:
obtaining an input sentence;
determining a type of a task-based response sentence that is to be generated, by updating a current dialogue state based on the input sentence;
generating the task-based response sentence by inputting the input sentence into a task-based dialogue response generator;
determining the task-based response sentence as a target response sentence in response to the type of the task-based response sentence being a designated type;
determining an intention of the input sentence in response to the type of the task-based response sentence being not the designated type; obtaining N previous response sentences adjacent to the input sentence from historical dialogues in response to the intention of the input sentence being not a chat intention, where N is a positive integer; and generating a current target response sentence based on the N previous response sentences;
generating a chat-based response sentence by inputting the input sentence into a chat-based dialogue response generator;
obtaining the historical dialogues in response to the intention of the input sentence being the chat intention;
determining a moment of chat ending based on the historical dialogues, the chat-based response sentence and the input sentence; and
when a current moment is the moment of chat ending, generating the current target response sentence based on the chat-based response sentence and a previous task-based response sentence adjacent to the input sentence in the historical dialogues.

2. The method as claimed in claim 1, wherein generating the current target response sentence based on the N previous response sentences comprises:
determining a previous response sentence as the current target response sentence in response to the previous response sentence being a clarification task-based sentence; or
determining a designated response sentence as the current target response sentence in response to the previous response sentence being not a clarification task-based sentence.

3. The method as claimed in claim 1, wherein generating the current target response sentence based on the N previous response sentences comprises:
determining, from the N previous response sentences, a clarification task-based response sentence having a greatest semantic similarity with the input sentence, as the current target response sentence; or
determining, from the N previous response sentences, a clarification task-based response sentence having a shortest time interval with the input sentence, as the current target response sentence.

4. The method as claimed in claim 1, further comprising:
generating a chat-based response sentence by inputting the input sentence into a chat-based dialogue response generator; and
determining the chat-based response sentence as the current target response sentence in response to the intention of the input sentence being the chat intention.

5. The method as claimed in claim 1, further comprising:
when the current moment is not the moment of chat ending, determining the chat-based response sentence as the current target response sentence.

6. The method as claimed in claim 1, wherein determining the moment of chat ending based on the historical dialogues, the chat-based response sentence and the input sentence comprises:
determining whether an associated task of the historical dialogues has been completed based on a type of a response sentence in the historical dialogues;
determining a relevance between the chat-based response sentence, the input sentence and the associated task in response to the associated task of the historical dialogues is not completed; and
determining that a current moment is the moment of chat ending in response to the relevance being greater than a threshold.

7. The method as claimed in claim 6, after determining whether the associated task of the historical dialogue has been completed, further comprising:
determining that the current moment is not the moment of chat ending in response to that the associated task of the historical dialogues has been completed.

8. The method as claimed in claim 6, after determining the relevance between the chat-based response sentence, the input sentence and the associated task, further comprising:
determining that the current moment is not the moment of chat ending in response to that the relevance being less than or equal to the threshold.

9. An electronic device, comprising:
at least one processor; and
a memory for communicating with the at least one processor; wherein,
the memory is configured to store instructions executable by the at least one processor, and when the instructions are executed by the at least one processor, the at least one processor is cause to:
obtain an input sentence;
determine a type of a task-based response sentence that is to be generated, by updating a current dialogue state based on the input sentence;
generate the task-based response sentence by inputting the input sentence into a task-based dialogue response generator;
determine the task-based response sentence as a target response sentence in response to the type of the task-based response sentence being a designated type;
determine an intention of the input sentence in response to the type of the task-based response sentence being not the designated type; obtain N previous response sentences adjacent to the input sentence from historical dialogues in response to the intention of the input sentence being not a chat intention, where N is a positive integer; and generate a current target response sentence based on the N previous response sentences;
generate a chat-based response sentence by inputting the input sentence into a chat-based dialogue response generator;
obtain the historical dialogues in response to the intention of the input sentence being the chat intention;
determine a moment of chat ending based on the historical dialogues, the chat-based response sentence and the input sentence; and
when a current moment is the moment of chat ending, generate the current target response sentence based on the chat-based response sentence and a previous task-based response sentence adjacent to the input sentence in the historical dialogues.

10. The electronic device as claimed in claim 9, wherein when the instructions are executed by the at least one processor, the at least one processor is cause to:
determine a previous response sentence as the current target response sentence in response to the previous response sentence being a clarification task-based sentence; or
determine a designated response sentence as the current target response sentence in response to the previous response sentence being not a clarification task-based sentence.

11. The electronic device as claimed in claim 9, wherein when the instructions are executed by the at least one processor, the at least one processor is cause to:
determine, from the N previous response sentences, a clarification task-based response sentence having a greatest semantic similarity with the input sentence, as the current target response sentence; or
determine, from the N previous response sentences, a clarification task-based response sentence having a shortest time interval with the input sentence, as the current target response sentence.

12. The electronic device as claimed in claim 9, wherein when the instructions are executed by the at least one processor, the at least one processor is cause to:
generate a chat-based response sentence by inputting the input sentence into a chat-based dialogue response generator; and
determine the chat-based response sentence as the current target response sentence in response to the intention of the input sentence being the chat intention.

13. The electronic device as claimed in claim 9, wherein when the instructions are executed by the at least one processor, the at least one processor is cause to:
when the current moment is not the moment of chat ending, determine the chat-based response sentence as the current target response sentence.

14. The electronic device as claimed in claim 9, wherein when the instructions are executed by the at least one processor, the at least one processor is cause to:
determine whether an associated task of the historical dialogues has been completed based on a type of a response sentence in the historical dialogues;
determine a relevance between the chat-based response sentence, the input sentence and the associated task in response to the associated task of the historical dialogues is not completed; and
determine that a current moment is the moment of chat ending in response to the relevance being greater than a threshold.

15. The electronic device as claimed in claim 14, wherein when the instructions are executed by the at least one processor, the at least one processor is cause to:
determine that the current moment is not the moment of chat ending in response to that the associated task of the historical dialogues has been completed, or
determine that the current moment is not the moment of chat ending in response to that the relevance being less than or equal to the threshold.

16. A non-transitory computer-readable storage medium storing computer instructions, wherein the computer instructions are configured to execute actions of:
obtaining an input sentence;
determining a type of a task-based response sentence that is to be generated, by updating a current dialogue state based on the input sentence;
generating the task-based response sentence by inputting the input sentence into a task-based dialogue response generator;
determining the task-based response sentence as a target response sentence in response to the type of the task-based response sentence being a designated type;
determining an intention of the input sentence in response to the type of the task-based response sentence being not the designated type; obtaining N previous response sentences adjacent to the input sentence from historical dialogues in response to the intention of the input sentence being not a chat intention, where N is a positive integer; and generating a current target response sentence based on the N previous response sentences;
generating a chat-based response sentence by inputting the input sentence into a chat-based dialogue response generator;
obtaining the historical dialogues in response to the intention of the input sentence being the chat intention;
determining a moment of chat ending based on the historical dialogues, the chat-based response sentence and the input sentence; and
when a current moment is the moment of chat ending, generating the current target response sentence based on the chat-based response sentence and a previous task-based response sentence adjacent to the input sentence in the historical dialogues.

* * * * *